UNITED STATES PATENT OFFICE.

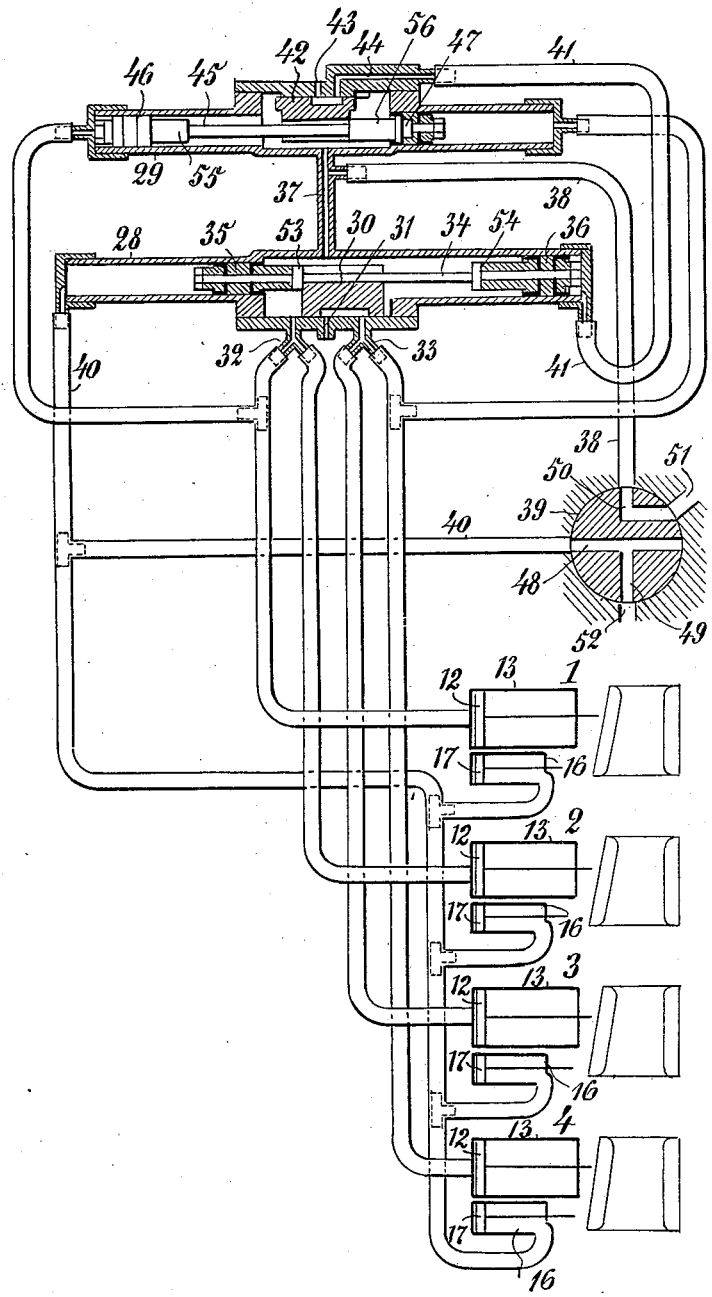

REGNER HENRY JULIUS GJETTING, OF COPENHAGEN, DENMARK.

PULSATOR FOR MILKING-MACHINES.

1,017,405.   Specification of Letters Patent.   Patented Feb. 13, 1912.

Application filed September 21, 1911. Serial No. 650,586.

*To all whom it may concern:*

Be it known that I, REGNER H. J. GJETTING, a subject of the King of Denmark, residing at Ribegade 15, Copenhagen, Denmark, have invented certain new and useful Improvements in Pulsators for Milking-Machines, of which the following is a specification.

The invention relates to a pulsator for milking machines especially of the kind in which the milking device has one fixed and one movable flap. The pulsator is constructed in such a manner, that all of the four milking devices will stop in an open position when the milking is ceased by turning a cock.

In the drawing, forming a part of this specification, an embodiment of my invention is shown, in which the pulsator proper and controlling valve is shown in central vertical section; the actuating means of the milking flaps, diagrammatically represented; and the various connections between the valves, pulsators and actuating means, in elevation.

The four milking devices are indicated by 1, 2, 3 and 4. The movable flap is acted upon at top by a pulsation cylinder 13 and at foot by a pressure-cylinder 16. For a complete disclosure, in detail, of the method of operation of the milking devices, particularly applicable to the pulsator herein disclosed by way of example, reference may be had to my copending application, Serial No. 650,585, filed September 21st, 1911. The pulsator consists of two mutually connected slide-boxes, the main slide-box 28 and the auxiliary slide-box 29. In the main slide-box 28 is found the main slide 30, the valve seat which has three ports, the middle one 31 of which leads to atmospheric air, while the two others 32 and 33 are connected with the pulsation cylinders 13 in the milking-devices 1, 2 and 3, 4 respectively. Through the slide 30 is led a displaceable piston-rod 34, carrying on each end a shoulder 53 and 54 and a piston 35 and 36, of which the latter has double the area of the former. The main slide-box 28 forms at its ends cylinders for these pistons. The space between the pistons 35 and 36 is, through a conduit 37, in constant connection with the corresponding space in the auxiliary slide-box 29, and the conduit 37 is, through the conduit 38, in connection with the cock 39. The space in the cylinder behind the small piston 35 is through the conduit 40 in connection with the cock 39, and the space in the cylinder behind the large piston 36 is through the conduit 41 in the below described manner in connection with the interior of the auxiliary slide. From the conduit 40 four conduits lead to the four pressure-cylinders 16. In the auxiliary slide-box 29 is found the auxiliary slide 42, the valve seat for which has a port 43 for the atmosphere and a port 44, to which leads the said conduit 41. Through the auxiliary slide 42 is led a displaceable piston-rod 45, which on each end carries a shoulder 55 and 56, and even-sized pistons 46 and 47. The space in the cylinder behind the piston 46 is in connection with the conduit from the port 32 to the pulsation-cylinder of the milking device 1 or 2, and the space in the cylinder behind the piston 47 is in a similar manner in connection with the conduit from the port 33 to the pulsation cylinder of the milking device 3 or 4.

The plug of the cock 39 has a through-channel 48 and a cross-channel going out from the same, as also an angle channel 50 independent of the same. In the box of the cock four channels open viz: the channel 51 for the atmosphere, the channel 52 for the compressed air reservoir, and further channels for the above named conduits 38 and 40.

Before starting the milking the cock 39 is turned into the position shown in the drawing, whereby the compressed air conduit 52 is connected with the conduit 40, so that compressed air is led in behind the end-piston 35 of the main slide of the pulsator, and into the front part of the four compressed air cylinders 16, which will return all of the pistons 12 and 17 in case they might have advanced somewhat for one reason or other. When thereafter the milking is to be commenced, the cock 39 is turned ¼ turn in the direction of the hand of a watch, so that the through-channel 48 will connect the conduits 38 and 52, while the cross-channel 49 is now leading to the conduit 40. Thus there will still be compressed air in this latter conduit, but compressed air will also be led through the conduit 38, so that the space between the two pistons in the slide-boxes is filled with compressed air. The main slide will immediately by the compressed air behind the piston 35 be carried to the position shown in the drawing, if not being beforehand in this starting position, while the space behind the piston 36 through the conduit 41 is in connection with the port 44 and 43 of the auxiliary slide and thus with the atmosphere. In this position compressed air will now pass through the port 32 to the pulsation-cylinder 13 in the devices 1 and 2, whereby the flaps of these devices are moved forward; simultaneously the pulsation-cylinder in the devices 3 and 4 is through the ports 33 and 31 in connection with the atmosphere. Through the port 32 compressed air will further be admitted behind the piston 46 of the auxiliary slide-box, which piston will thus move to the right in the drawing, so that the auxiliary slide 42 at the end of this connection will also be moved so much to the right, that the port 43 to the atmosphere is covered, while the port 44 receives compressed air; during this movement the space behind the piston 47 is in connection with the atmosphere through the ports 33 and 31. The compressed air from the port 44 is admitted behind the piston 36 in the main slide-box, thereby moving the piston-rod 34 to the left against the pressure, which is constantly found behind the piston 35; therefore the piston 36 has double the area of the piston 35. At the end of this movement the main slide 30 is moved to the left, so that the conduit 32 through 31 is set in connection with the atmosphere, which causes the pulsation-pistons in the devices 1 and 2 to move rearward; simultaneously compressed air is through the port 33 led into the pulsation-cylinders in the devices 3 and 4, the movable flaps of which will thus now move forward. Through the port 33 compressed air will at same time be admitted behind the piston 47 in the auxiliary slide-box; this piston moves to the left and the movement described is recommenced.

When the milking is to cease, the main slide is for instance in the position shown in the drawing. The pulsation-cylinders in the devices 3 and 4 are then through the main slide in connection with the atmosphere, while there is compressed air in the pulsation-cylinders of the two other devices. The cock 39 is now returned to the position shown in the drawing, in which compressed air is constantly admitted to the pressure-cylinders, while the conduit 38 through the angle-channel 50 is put into connection with the atmosphere. Through the conduit 38 there is connection with the atmosphere through the ports 37 and 32 to the pulsation-cylinders in the devices 1 and 2. All of the four pulsation-cylinders are thus now in connection with the atmosphere, so that all of the movable flaps will stop in the withdrawn position.

If the main slide is in any other position than that shown in the drawing, when the milking is to cease, it will always go into this position when the cock 39 is turned to the position shown, as then only compressed air before the piston 35 of the main slide-box will remain, whereby it is always secured that all of the four pulsation cylinders are in connection with the atmosphere, so that none of the milking flaps will protrude and press on the teats, when the machine is to be taken off the cow.

Having now described my invention what I claim and desire to secure by Letters Patent of U. S. A. is:

1. In a milking machine, the combination with a plurality of pairs of coacting pulsating cylinders and pressure cylinders for actuating the milking flaps, of twin cylinders provided with pistons, one of said cylinders being provided with a larger diametrical bore than the other, a valve device provided with independent conducting ports each in communication with one of said pulsating cylinders, and an exhaust port, means operatively connecting said pistons and valve device to actuate the latter, providing alternate opening of said ports to the exhaust and the interior of the valve device, upon reciprocation of said pistons, two auxiliary cylinders provided with pistons, each cylinder having independent connections with one of said pulsating cylinders, a second valve device in communication with said first mentioned valve device, provided with a conducting port in communication with the said cylinder provided with the larger bore, and an exhaust port, mechanism operatively connecting the pistons of said auxiliary cylinders with second mentioned valve device to actuate the latter, upon reciprocation of said pistons, providing alternate communication between the conducting port and exhaust port thereof, or communication between the former and interior of the valve device, means for delivering fluid pressure to said valve devices, means for delivering fluid pressure to said cylinder of said first mentioned cylinder provided with a small bore, the fluid pressure delivered to said cylinder and valve devices being substantially uniform, and mechanism for controlling both of the said fluid pressure delivering means.

2. In a milking machine, the combination with a plurality of pairs of coacting pulsating cylinders and pressure cylinders for actuating the milking flaps, of twin cylinders provided with pistons, one of said cylinders being provided with a larger diametrical bore than the other, a valve device provided with independent conducting ports each in communication with one of said pulsating cylinders, and an exhaust port, means operatively connecting said pistons and valve device, to actuate the latter providing alternate opening of said ports to the exhaust and the interior of the valve device, upon reciprocation of said pistons, two auxiliary cylinders provided with pistons, each cylinder having an independent connection with one of said pulsating cylinders, a second valve device in communication with said first mentioned valve device, provided with a conducting port in communication with the said cylinder provided with the larger bore, and an exhaust port, mechanism operatively connecting the pistons of said auxiliary cylinders and said second mentioned valve device to actuate the latter upon reciprocation of the pistons, providing alternate communication between the conducting port and exhaust port thereof, or communication between the former and interior of the valve device, means for delivering fluid pressure to said valve devices, means for delivering fluid pressure to said cylinder of said first mentioned cylinder provided with the smaller bore, the fluid pressure delivered to the said cylinder and valve devices being substantially uniform, and means for simultaneously opening said last mentioned delivery means and opening said valve devices to the atmosphere, or simultaneously opening both of the said delivery means for conveyance of fluid pressure.

3. In a milking machine, the combination with a plurality of pairs of coacting pulsating cylinders and pressure cylinders for actuating the milking flaps, of twin cylinders provided with pistons, one of said cylinders provided with a larger diametrical bore than the other, a valve device provided with independent conducting ports each in communication with one of said pulsating cylinders, and an exhaust port, means operatively connecting said pistons and valve device to actuate the latter, producing alternate opening of said ports to the exhaust and the interior of the valve device, upon reciprocation of said pistons, a second valve device in communication with said first mentioned valve device provided with a conducting port in communication with the said cylinder provided with the larger bore, and an exhaust port, means for delivering fluid pressure to said valve device, means for operating said second mentioned valve device relative to the position of said pistons to open the said cylinder of larger diametrical bore to the exhaust when the piston is in a forward position, and to open the communication between the said cylinder and valve device for introduction of fluid pressure into the cylinder upon movement of the said piston to a rearward position with respect to the cylinder, means for delivering fluid pressure to said cylinder of said first mentioned cylinders provided with the smaller bore, the fluid pressure delivered to the said cylinder and valve devices being substantially uniform, and mechanism for controlling both of the said fluid pressure delivering means.

4. In a milking machine, the combination with a plurality of pairs of coacting pulsating cylinders and pressure cylinders for actuating the milking flaps, of twin cylinders provided with pistons, one of said cylinders being provided with a larger diametrical bore than the other, a valve device provided with independent conducting ports each in communication with one of said pulsating cylinders, and an exhaust port, means operatively connecting said pistons and valve device to actuate the latter providing alternate opening of said ports to the exhaust and the interior of the valve device upon reciprocation of the said pistons, a second valve device in communication with said first mentioned valve device, provided with a conducting port in communication with the said cylinder provided with the larger bore, and an exhaust port, means for delivering fluid pressure to said valve devices, means for operating said second mentioned valve device relative to the position of said pistons to open the said cylinder of larger diametrical bore to the exhaust when the piston is in a forward position, and to open the communication between the said cylinder and valve device for introduction of fluid pressure into the cylinder upon movement of the said piston to a rearward position with respect to the cylinder, means for delivering fluid pressure to said cylinder of said first mentioned cylinders provided with the smaller bore, the fluid pressure delivered to the said cylinder and valve devices being substantially uniform, and means for simultaneously opening said last mentioned delivery means and opening said valve devices to the atmosphere, or simultaneously opening both of the said delivery means for conveyance of fluid pressure.

In testimony whereof I have affixed my signature in presence of two witnesses.

REGNER HENRY JULIUS GJETTING.

Witnesses:
F. PETERSEN,
W. SLETTING.